(12) United States Patent
Lundberg et al.

(10) Patent No.: US 8,430,220 B2
(45) Date of Patent: Apr. 30, 2013

(54) WET DUAL CLUTCH TRANSMISSION CONTROL SYSTEM

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 12/794,322

(22) Filed: Jun. 4, 2010

(65) Prior Publication Data

US 2011/0297499 A1    Dec. 8, 2011

(51) Int. Cl.
*B60W 10/02* (2006.01)
*B60W 10/10* (2012.01)
*F16D 25/10* (2006.01)

(52) U.S. Cl.
USPC ............... 192/3.58; 192/48.609; 192/85.63; 74/335

(58) Field of Classification Search ............... None
See application file for complete search history.

(56) References Cited

U.S. PATENT DOCUMENTS

| | | | |
|---|---|---|---|
| 5,240,093 A * | 8/1993 | Wagner et al. | 192/3.58 |
| 7,401,689 B2 * | 7/2008 | Hegerath et al. | 192/3.58 |
| 7,418,885 B2 * | 9/2008 | Muller et al. | 74/335 |
| 7,849,986 B2 * | 12/2010 | Kitou et al. | 192/3.58 |
| 2010/0190606 A1 * | 7/2010 | Moses et al. | 477/168 |
| 2011/0198178 A1 * | 8/2011 | Lundberg et al. | 192/3.57 |
| 2012/0138406 A1 * | 6/2012 | Lundberg et al. | 192/3.58 |

FOREIGN PATENT DOCUMENTS

DE        10134115  A1     1/2003

* cited by examiner

*Primary Examiner* — Rodney Bonck

(57) ABSTRACT

Pairs of variable feed solenoid valves provide fluid to a pair of input clutch actuators and a pair of inlet ports of a first or logic valve. The position of the first logic valve spool is controlled by a solenoid valve. A first pair of outlet ports of the first logic valve provide fluid to a first piston which selects two speed ratios. A second pair of outlet ports of the first logic valve provide fluid to a pair of inlet ports of a second logic valve. The position of the second logic valve spool is controlled by fluid from the input clutch circuits. A first pair of outlet ports of the second logic valve provide fluid to a second piston which selects two other speed ratios and a second pair of outlet ports of the second logic valve provide fluid to a third piston which selects two additional speed ratios.

15 Claims, 3 Drawing Sheets

WET DUAL CLUTCH TRANSMISSION CONTROL SYSTEM

FIELD

The present disclosure relates to a hydraulic control system for a transmission and more particularly to a hydraulic control system for a wet dual clutch transmission.

BACKGROUND

The statements in this section merely provide background information related to the present disclosure and may or may not constitute prior art.

In addition to conventional manual transmissions which employ an operator guided shift lever to selectively engage one of a plurality of parallel shift rails having shift forks coupled to synchronizer clutches and conventional automatic transmissions which employ a plurality of planetary gear sets and clutches and brakes that engage and disengage various components thereof, there is now an increasingly popular third option: the dual clutch transmission or DCT. In a typical dual clutch transmission, a plurality of synchronizer clutches and adjacent gears disposed on two parallel countershafts are exclusively engaged, followed by engagement of one of two main or input clutches associated with the respective countershafts.

Such dual clutch transmissions typically have five or six forward gears or speeds and reverse and thus three or four actuators to translate the synchronizer clutches. Such actuators are typically bi-directional hydraulic, electric or pneumatic devices. Electric actuators may be controlled by microprocessors having embedded logic software and hydraulic and pneumatic actuators may be controlled by fluid logic circuits having solenoid valves under microprocessor control.

Because of their excellent fuel economy and sporty performance including rapid shifts, which parallels that of manual transmissions, dual clutch transmissions are gaining recognition and acceptance in the marketplace. Given this trend, activity directed to all aspects of dual clutch design, control and operation is ongoing and the present invention is the result of such activity.

SUMMARY

The present invention provides a high efficiency hydraulic control system for a wet dual clutch transmission having an engine driven pump. A first pair of variable force solenoid (VFS) valves independently and mutually exclusively provide hydraulic fluid to a respective pair of main or input clutch actuators. A second pair of variable force solenoid valves provide hydraulic fluid to a pair of inlet ports of a first spool or logic valve. The position of the spool of the first logic valve is controlled by an on-off (two position) solenoid valve. A first pair of outlet ports of the first logic valve selectively provide hydraulic fluid to a first three area piston which selects two gear or speed ratios, for example, reverse and third gear. A second pair of outlet ports of the first logic valve selectively provide hydraulic fluid to a pair of inlet ports of a second spool or logic valve. The position of the spool of the second logic valve is controlled by hydraulic fluid from the main or input clutch circuits. A first pair of ports of the second logic valve selectively provide hydraulic fluid to a second three area piston which selects two other gear or speed ratios, for example, first and fifth gears and a second pair of ports of the second logic valve selectively provide hydraulic fluid to a third three area piston which selects two additional gear or speed ratios, for example, second and fourth gears.

Thus it is an aspect of the present invention to provide a hydraulic control system for a wet dual clutch transmission.

It is a further aspect of the present invention to provide a hydraulic control system for a wet dual clutch transmission having two main or input clutch actuators and two logic valves.

It is a still further aspect of the present invention to provide a hydraulic control system for a wet dual clutch transmission having an engine driven pump.

It is a still further aspect of the present invention to provide a hydraulic control system for a wet dual clutch transmission having a plurality of three area shift actuators.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
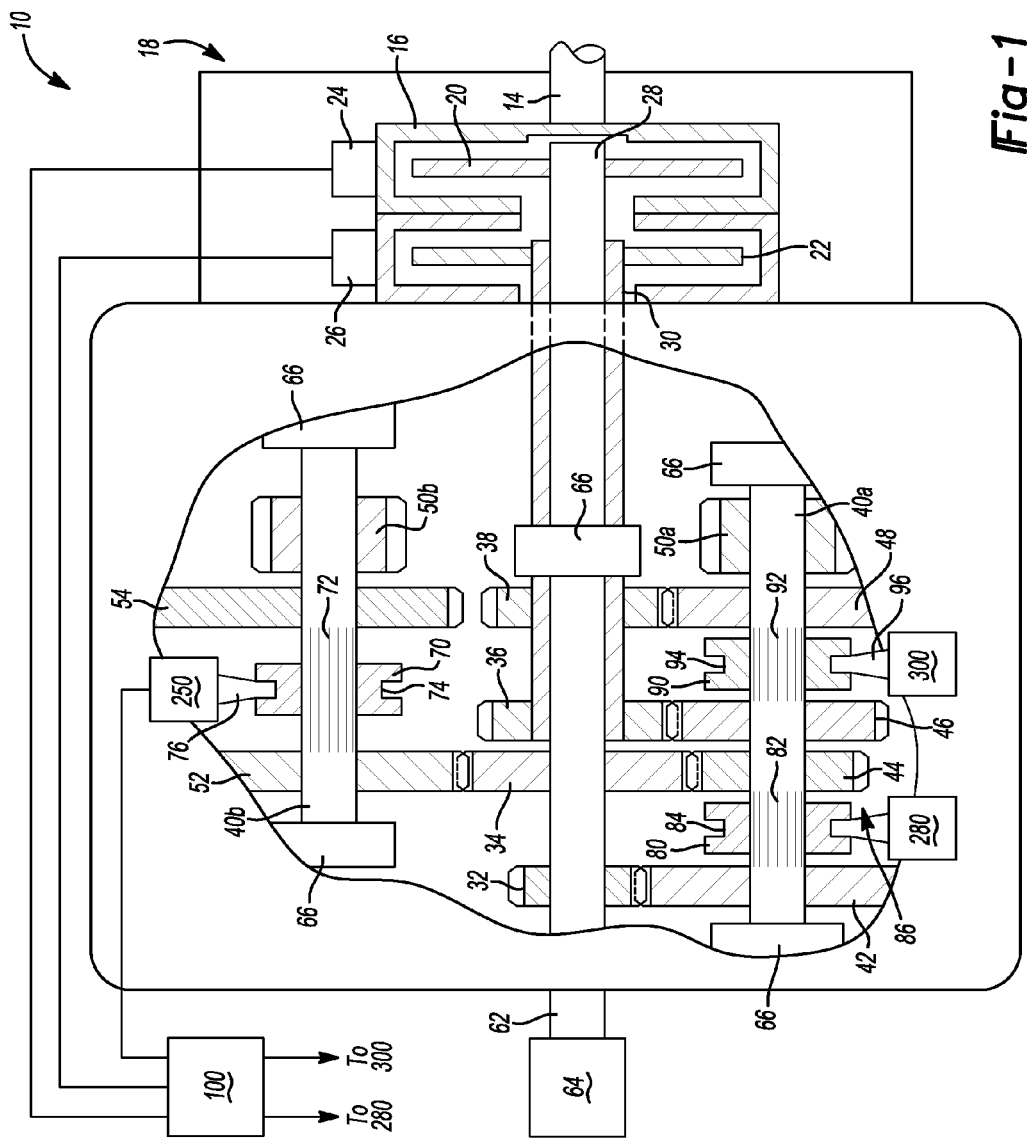
FIG. 1 is a diagrammatic top plan view of a five speed wet dual clutch automatic transmission incorporating a hydraulic control system according to the present invention.

With reference to FIG. 1, a wet dual clutch transmission incorporating the present invention is illustrated and generally designated by the reference number 10. The wet dual clutch transmission 10 includes a housing 12 having a plurality of bores, openings, flanges and the like which receive, locate and retain the components of the transmission 10. An input shaft 14 is coupled to and driven by a prime mover (not illustrated) such as a gasoline, Diesel, hybrid or electric power plant. The input shaft 14 is coupled to an input or housing 16 of a dual clutch assembly 18. The dual clutch assembly 18 includes a pair of wet input clutches, a first input clutch 20 and a second input clutch 22 which are commonly driven by the housing 16. The pair of input clutches 20 and 22 are controllably engaged or disengaged by a respective pair of hydraulic actuators or operators 24 and 26. The controlled output of the first input clutch 20 drives a first drive shaft 28 and the controlled output of the second input clutch 22 drives a second, concentrically disposed quill, drive tube or hollow shaft 30.

One of the features and benefits of dual clutch transmissions is the speed of an adjacent gear shift, e.g., a second gear to third gear upshift. Exceedingly rapid shifts are possible because the gear that is next to be engaged (third, for example) can be preselected or prestaged by synchronizing and connecting it to its countershaft. Actual engagement then involves only opening the input clutch associated with the currently engaged gear (second, for example) and engaging the input clutch associated with the new, desired gear (third). This feature requires that the gears be arranged so that numerically adjacent gears are not driven by the same input clutch. For example, first, third and fifth gears, the odd numbered gears, are arranged so that they are driven by one clutch and second, fourth and reverse gears, the even numbered gears, are driven by the other clutch—thereby permitting alternation of the active input clutches as a normal upshift progression through the gears occurs.

The wet dual clutch transmission 10 is configured to operate in this manner. On the first drive shaft 28 are a first drive gear 32 and a larger, second drive gear 34. The first drive gear 32 and the second drive gear 34 are coupled to and driven by the first drive shaft 28. On the second quill or drive tube 30 are a third drive gear 36 and a smaller, fourth drive gear 38. The third drive gear 36 and the fourth drive gear 38 are coupled to and driven by the second quill or drive tube 30.

A first countershaft or driven shaft 40A receives four freely rotating gears which are disposed in two, spaced-apart pairs. Each of the four gears is in constant mesh with one of the drive gears 32, 34, 36 or 38. A first large, driven gear 42 which provides the largest speed reduction and corresponds to first gear is in constant mesh with the first drive gear 32 on the first drive shaft 28. A second, smallest driven gear 44 provides the smallest speed reduction and corresponds to the highest gear, in this case, fifth gear. The second driven gear 44 is in constant mesh with the second drive gear 34 on the first drive shaft 28. A third, intermediate size driven gear 46 provides an intermediate speed ratio which corresponds to fourth gear. The third driven gear 46 is in constant mesh with the third drive gear 36 on the second quill or drive tube 30. A fourth intermediate size driven gear 48 provides another intermediate speed ratio which corresponds to second gear. The fourth driven gear 48 is in constant mesh with the fourth drive gear 38 on the second quill or drive tube 30. A first output gear 50A is coupled to and driven by the first countershaft or driven shaft 40A.

A second countershaft or driven shaft 40B receives two freely rotating gears which are disposed in a spaced-apart pair. Each of the gears is in constant mesh with a drive gear. A fifth, smaller driven gear 52 provides another intermediate speed ratio which corresponds to third gear. The fifth driven gear 52 is in constant mesh with the second drive gear 34 on the first drive shaft 28. A sixth, larger driven gear 54 provides reverse. A reverse idler gear (not illustrated) is in constant mesh with both the sixth driven gear 54 and the fourth drive gear 38 on the second quill or drive tube 30. A second output gear 50B is coupled to and driven by the second countershaft or driven shaft 40B.

The first output gear 50A and the second output gear 50B mesh with and commonly drive an output gear (not illustrated) which is coupled to and drives an output shaft 62. The output shaft 62, in turn, drives a final drive assembly (FDA) 64 which may include a prop shaft, transfer case, at least one differential, axles and wheels (all not illustrated). The drive shaft 28 and the drive quill 30 as well as the countershafts 40A and 40B are preferably rotatably supported by pairs of ball bearing assemblies 66.

It should be appreciated that the actual numerical gear ratios provided by the driven gears 42, 44, 46, 48, 52 and 54 (and their associated drive gears) are a matter of design choice based upon the actual specifications and desired characteristics of the vehicle and its powertrain. Moreover, it should be appreciated that the arrangement of the gears 42, 44, 46, 48, 52 and 54 on the countershafts 40A and 40B is illustrative only and that they may be disposed in other arrangements with the proviso, stated above, that the gears of adjacent gear ratios, i.e., first and second, fourth and fifth, must be configured so that one input clutch provides one gear and the other input clutch provides the adjacent gear ratio.

Disposed intermediate the fifth driven gear 52 and the reverse gear 54 is a first double synchronizer clutch 70. The first synchronizer clutch 70 is slidably coupled to the second countershaft 40B by a spline set 72 and rotates therewith. The first synchronizer clutch 70 includes synchronizers and face or dog clutches (not illustrated) which selectively synchronize and then positively couple the fifth driven gear 52 or the reverse gear 54 to the second countershaft 40B when it is translated to the left or right. The first synchronizer clutch 70 includes a circumferential channel or groove 74 which is engaged by a second shift fork 76.

Disposed intermediate the first driven gear 42 and the second driven gear 44 is a second double synchronizer clutch 80. The second synchronizer clutch 80 is slidably coupled to the first countershaft 40A by a spline set 82 and rotates therewith. The second synchronizer clutch 80 includes synchronizers and face or dog clutches (not illustrated) which selectively synchronize and then positively couple the first driven gear 42 or the second driven gear 44 to the first countershaft 40A when it is translated to the left or right, as illustrated in FIG. 1. The second synchronizer clutch 80 includes a circumferential channel or groove 84 which is engaged by a first shift fork 86.

Disposed intermediate the third driven gear 46 and the fourth driven gear 48 is a third double synchronizer clutch 90. The third synchronizer clutch 90 is slidably coupled to the first countershaft 40A by a spline set 92 and rotates therewith. The third synchronizer clutch 90 also includes synchronizers and face or dog clutches (not illustrated) which selectively synchronize and then positively couple the third driven gear 46 or the fourth driven gear 48 to the first countershaft 40A when it is translated to the left or right. The third synchronizer clutch 90 includes a circumferential channel or groove 94 which is engaged by a third shift fork 96.

Figure 2:
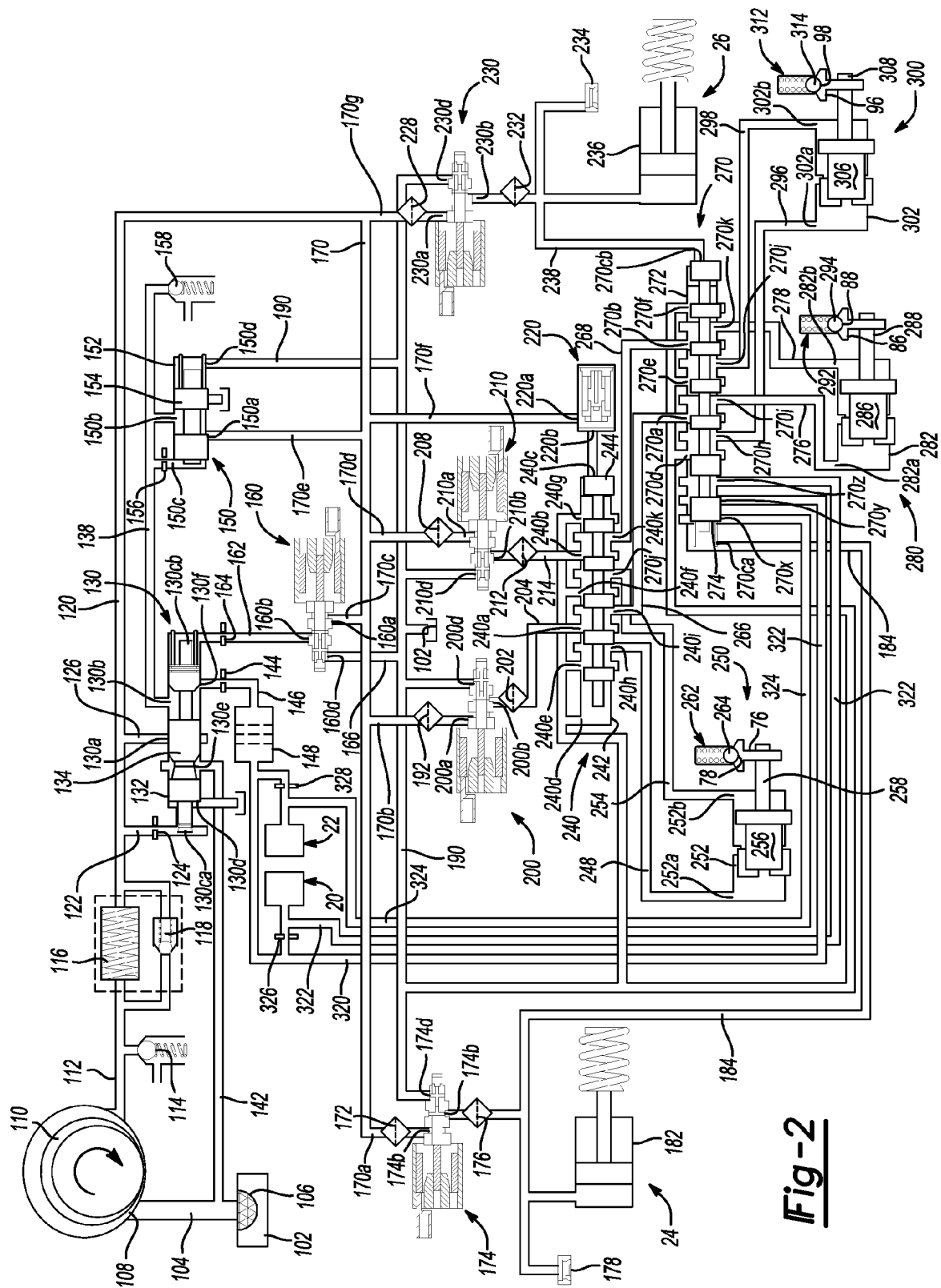
FIG. 2 is a schematic flow diagram of a first embodiment of a hydraulic control system for a wet dual clutch transmission according to the present invention.

Referring now to FIG. 2, a first embodiment of a hydraulic control system for the wet dual clutch transmission 10 illustrated in FIG. 1 is illustrated and generally designated by the reference number 100. The hydraulic control system 100 includes a sump 102 which is preferably disposed in a lower portion of the transmission housing 12. A first suction line 104 which preferably includes an inlet filter 106 communicates between the sump 102 and an inlet or suction port 108 of an engine driven mechanical pump 110. The engine driven pump 110 is preferably a vane, gear or gerotor pump and provides pressurized hydraulic fluid in a first supply line 112. The first supply line 112 is in fluid communication with a pressure relief or line blow off valve 114 and a filter 116 which is in fluid parallel with a cold oil bypass valve 118. The cold oil bypass valve 118 ensures that, notwithstanding the high viscosity of cold oil or hydraulic fluid and reduced flow through the filter 116 during cold weather start-ups, oil or hydraulic fluid will be available and supplied to downstream components. The filter 116 and the cold oil bypass valve 118 communicate with a main supply line 120 having a first branch 122 which includes a flow restricting orifice 124 and a second branch 126. Both of the branches 122 and 126 communicate with a cooling priority and line pressure regulator 130.

The cooling priority and line pressure regulator 130 includes a cylindrical housing 132 having a plurality of ports and which receives a spool 134 having multiple lands. The line pressure regulator 130 includes a first inlet port 130A in communication with the second branch 126 of the main supply line 120, a second inlet port 130B in communication with a line 138 to a cooler pressure feed limit valve 150 and a first control port 130CA in communication with the orifice 124. Adjacent the first control port 130CA is an exhaust port 130D which communicates with the sump 102. A first outlet port 130E of the line pressure regulator 130 communicates with the sump 102 through a line 142, a second outlet port 130F communicates through a flow restricting orifice 144 in a line 146 to an oil or hydraulic fluid cooler 148. The line pressure regulator 130 also includes a second control port 130CB.

The cooler pressure feed limit valve 150 includes a cylindrical housing 152 having a plurality of ports and which receives a spool 154 having two lands. The line 138 from the second inlet port 130B of the line pressure regulator 130 communicates with a control port 150C of the cooler pressure feed limit valve 150 through an orifice 156. An outlet port 150B of the cooler pressure feed limit valve 150 is also connected to the line 138. An inlet port 150A communicates with a manifold 170 through a fifth manifold supply line 170E. An exhaust port 150D is connected to a fluid exhaust manifold 190. The line 138 also communicates with a cooler overpressure check valve 158 which relieves or limits maximum pressure in the line 138.

A line pressure variable force solenoid (VFS) valve 160 includes an inlet port 160A which is connected to a third manifold supply line 170C, an outlet port 160B which is connected to the second control port 130CB of the line pressure regulator 130 through a line 162 having a flow restricting orifice 164 and an exhaust port 160D which communicates with the fluid exhaust manifold 190 through a line 166.

The main supply line 120 communicates with the main manifold 170 which includes a plurality of ports, outlets or manifold supply lines. A first manifold supply line 170A communicates through a filter 172 with an inlet port 174A of a first (even) clutch variable force solenoid (VFS) valve 174 having an outlet port 174B which communicates through a filter 176 to a first (even) clutch pressure sensor or switch 178, a cylinder 182 of the first (even) clutch actuator or operator 24 and a logic valve supply line 184. An exhaust port 174D of the first clutch solenoid valve 174 is in fluid communication with a fluid exhaust manifold 190. A second manifold supply line 170B communicates through a filter 192 with an inlet port 200A of a first shift variable force solenoid (VFS) valve 200. The first shift variable force solenoid valve 200 includes an outlet port 200B which is in fluid communication with a filter 202 and a fluid supply line 204. An exhaust port 200D is in fluid communication with the fluid exhaust manifold 190.

As noted above, the third manifold supply line 170C communicates with the inlet port 160A of the line pressure solenoid valve 160. A fourth manifold supply line 170D communicates through a filter 208 with an inlet port 210A of a second shift variable force solenoid (VFS) valve 210. The second shift variable force solenoid valve 210 includes an outlet port 210B which is in fluid communication with a filter 212 and a fluid supply line 214. An exhaust port 210D is in fluid communication with the fluid exhaust manifold 190. As noted above, the fifth manifold supply line 170E communicates with the inlet port 150A of the cooler pressure feed limit valve 150. A sixth manifold supply line 170F communicates with an inlet port 220A of a master logic solenoid valve 220. Finally, a seventh manifold supply line 170G communicates through a filter 228 with an inlet port 230A of a second (odd) clutch variable force solenoid (VFS) valve 230 having an outlet port 230B which communicates through a filter 232 to a second (odd) clutch pressure sensor or switch 234, a cylinder 236 of the second clutch actuator or operator 26 and a logic valve supply line 238. An exhaust port 230D of the second clutch solenoid valve 230 is in fluid communication with the fluid exhaust manifold 190.

Returning to the master logic solenoid valve 220, it includes an outlet port 220B which is in fluid communication with a control port 240C of a first or master logic spool or control valve 240. The first or master logic spool or control valve includes a housing 242 having or defining a plurality of inlet and outlet ports and which receives a spool 244 having a plurality of lands which separate and control fluid flows through the housing 242. When the master logic solenoid valve 220 is de-energized or inactive, no pressurized hydraulic fluid is provided to the control port 240C and the spool 244 resides in the position illustrated in FIG. 2. When the master logic solenoid valve 220 is energized or active, pressurized hydraulic fluid is provided to the control port 240C and the spool 244 translates to the left in FIG. 2.

The first or master logic spool or control valve 240 includes a first inlet port 240A which is fluid communication with the outlet port 200B of the first shift variable force solenoid valve 200 through the line 204 and a second inlet port 240B which is fluid communication with the outlet port 210B of the second shift variable force solenoid valve 210 through the line 214. The first or master logic spool or control valve 240 includes a plurality of exhaust ports 240D, 240E, 240F and 240G which communicate through a branch or extension of the fluid exhaust manifold 190 to the sump 102. The first or master logic spool or control valve 240 also includes a first outlet port 240H which communicates through a line 248 with a port 252A in a housing or cylinder 252 of a first shift actuator assembly 250. At the opposite end of the cylinder 252, a second port 252B communicates through a line 254 to a third outlet port 240J.

The first shift actuator assembly 250 includes a three area piston 256. The three area piston 256 is a conventional hydraulic component that, by virtue of its construction, provides three distinct operational positions: a first position at one end or limit of piston travel, a second fixed or defined position generally midway in its travel and a third position at the other end or limit of piston travel. The end positions of the piston 256 (and the other three area pistons) typically engage gears whereas the center position is neutral. The end positions are achieved by appropriate application and release of hydraulic fluid on the faces of the pistons whereas the center position is achieved by pressurizing both faces of the pistons equally.

The three area piston 256 is connected to a piston rod 258 which, in turn, is connected to the first shift fork 76. The first shift actuator assembly 250 and specifically the piston rod 258 preferably includes or is connected to a position switch or position sensor (not illustrated) which provides data regarding its current position. Dependent on failure modes, there are cases in which the switch on two of the rails may be eliminated and replaced with pressure switches on the outlet ports 200B and 210B of the first and second shift variable force solenoid (VFS) valves, 200 and 210. Alternatively, shift actuators having two area pistons, which lack the defined center position, may be utilized instead of the three area pistons but will require the addition of linear (proportional) position sensors to provide continuous data regarding the position of the piston, piston rod and shift fork. A first detent assembly 262 having a spring biased detenting ball 264 or similar structure cooperates with a detenting recess 78 on the first shift fork 76 and assists obtaining and maintaining a selected position of the shift fork 76.

When the master logic solenoid 220 is energized or active, pressurized hydraulic fluid is provided to the control port 240C and the spool 244 translates to the left. So disposed, hydraulic fluid controlled by the first shift variable force solenoid valve 200 travels through the lines 204 and 248 and translates the three area piston 256 to the right to engage, for example, reverse. Alternatively, hydraulic fluid controlled by the second shift variable force solenoid valve 210 travels through the lines 214 and 254 and translates the three area piston 256 to the left to engage, for example, third gear. It will be appreciated that accompanying such operation, and that described below, is the release of hydraulic fluid from the unpressurized side of the cylinder 252 to the fluid exhaust manifold 190. Moreover, the neutral, center position of the piston 256 is achieved by providing pressurized hydraulic fluid through both shift variable force solenoid valves 200 and 210 and both lines 248 and 254, as described above. When the master logic solenoid 220 is de-energized or inactive, the spool 244 returns to and resides in the position illustrated in FIG. 2, as noted above.

A second outlet port 240I of the first or master logic spool or control valve 240 communicates with a line 266 to a first inlet port 270A of a second or slave logic spool or control valve 270 and a fourth outlet port 240K of the first or master logic spool or control valve 240 communicates with a line 268 to a second inlet port 270B of the second or slave logic valve 270. The second or slave logic valve 270 includes a housing 272 having or defining a plurality of inlet and outlet ports and which receives a spool 274 having a plurality of lands which separate and control fluid flows through the housing 272.

The second or slave logic valve 270 includes a first control port 270CA which is in fluid communication with the hydraulic line 184 and a second control port 270CB which is in fluid communication with the hydraulic line 238. It will thus be appreciated that the position of the spool 274 of the second or slave logic valve 270 is dictated by whether the first (even) input clutch 20 is activated and thus that there is hydraulic pressure in the line 184 or that the second (odd) input clutch 22 is activated and thus that there is hydraulic pressure in the line 238. The second or slave logic valve also includes a plurality of exhaust ports 270D, 270E and 270F which communicate through the fluid exhaust manifold 190 which flows to the sump 102.

The second or slave logic spool or control valve 270 also includes a second outlet port 270I which communicates through a line 276 with a port 282A in a housing or cylinder 282 of a second shift actuator assembly 280. At the opposite end of the cylinder 282, a second port 282B communicates through a line 278 to a fourth outlet port 270K. The second shift actuator assembly 280 also includes a three area piston 286. The three area piston 286 is connected to a second piston rod 288 which, in turn, is connected to the second shift fork 86. A second detent assembly 292 having a spring biased detenting ball 294 or similar structure cooperates with a detenting recess 88 on the second shift fork 86 and assists obtaining and maintaining a selected position of the second shift fork 86.

The second or slave logic spool or control valve 270 further includes a first outlet port 270H which communicates through a line 296 with a port 302A in a housing or cylinder 302 of a third shift actuator assembly 300. At the opposite end of the cylinder 302, a second port 302B communicates through a line 298 to a third outlet port 270J. The third shift actuator assembly 300 also includes a three area piston 306. The three area piston 306 is connected to a third piston rod 308 which, in turn, is connected to the third shift fork 96. A third detent assembly 312 having a spring biased detenting ball 314 or similar structure cooperates with a detenting recess 98 on the third shift fork 96 and assists obtaining and maintaining a selected position of the third shift fork 96.

Selection and operation of first, second, fourth and fifth gears will now be described with emphasis on the second spool or control valve 270. When the second spool or control valve 270 is in the de-energized or relaxed position illustrated in FIG. 2, and the spool 244 of the first spool or control valve 240 is also in its de-energized or relaxed position as also illustrated in FIG. 2, pressurized hydraulic fluid provided through the line 266 and the first inlet port 270A will be routed to the second outlet port 270I and through the line 276 and the port 282A to translate the second piston 286 to the right to engage, for example, fifth gear. Alternatively, pressurized hydraulic fluid provided through the line 268 and the second inlet port 270B will be routed to the fourth outlet port 270K and through the line 278 and the port 282B to translate the second piston 286 to the left to engage, for example, first gear.

When the second spool or control valve 270 is in the energized or active position, to the left in FIG. 2, and the spool 244 of the first spool or control valve 240 is in its de-energized or relaxed position as illustrated in FIG. 2, pressurized hydraulic fluid provided through the line 266 and the first inlet port 270A will be routed to the first outlet port 270H and through the line 296 and the port 302A to translate the third piston 306 to the right to engage, for example, second gear. Alternatively, pressurized hydraulic fluid provided through the line 268 and the second inlet port 270B will be routed to the third outlet port 270J and through the line 298 and the port 302B to translate the third piston 306 to the left to engage, for example, fourth gear.

Last of all, the second or slave logic spool or control valve 270 includes a clutch cooler inlet port 270Y which is in fluid communication with the outlet of the hydraulic fluid cooler 148 through a hydraulic line 320. When the spool 274 of the second spool or control valve 270 is in the de-energized or relaxed position illustrated in FIG. 2, hydraulic fluid flows out an outlet port 270Z and returns in a line 322 to provide cooling of the first clutch 20 associated with the even numbered gears. A flow controlling orifice 326 is disposed between the hydraulic line 320 and the line 322.

When the spool 274 of the second spool or control valve 270 is in the energized or active position, to the left in FIG. 2, hydraulic fluid flows out an outlet port 270X and returns in a line 324 to provide cooling of the second clutch 22 associated with the odd numbered gears. Another flow controlling orifice 328 is disposed between the hydraulic line 320 and the line 324. In operation, hydraulic fluid from the cooler pressure regulator 150 flows in the line 138, through the cooling priority and line pressure regulator valve 130, through the orifice 194 and the cooler 148. Then the hydraulic fluid flows either through the line 320 to the inlet port 270Y of the second logic or spool valve 270 which prioritizes fluid flow to either the line 322 and the first clutch 20 or the line 324 and the second clutch 22 or simply through the orifices 326 and 328 to the respective clutches 20 and 22.

Figure 3:
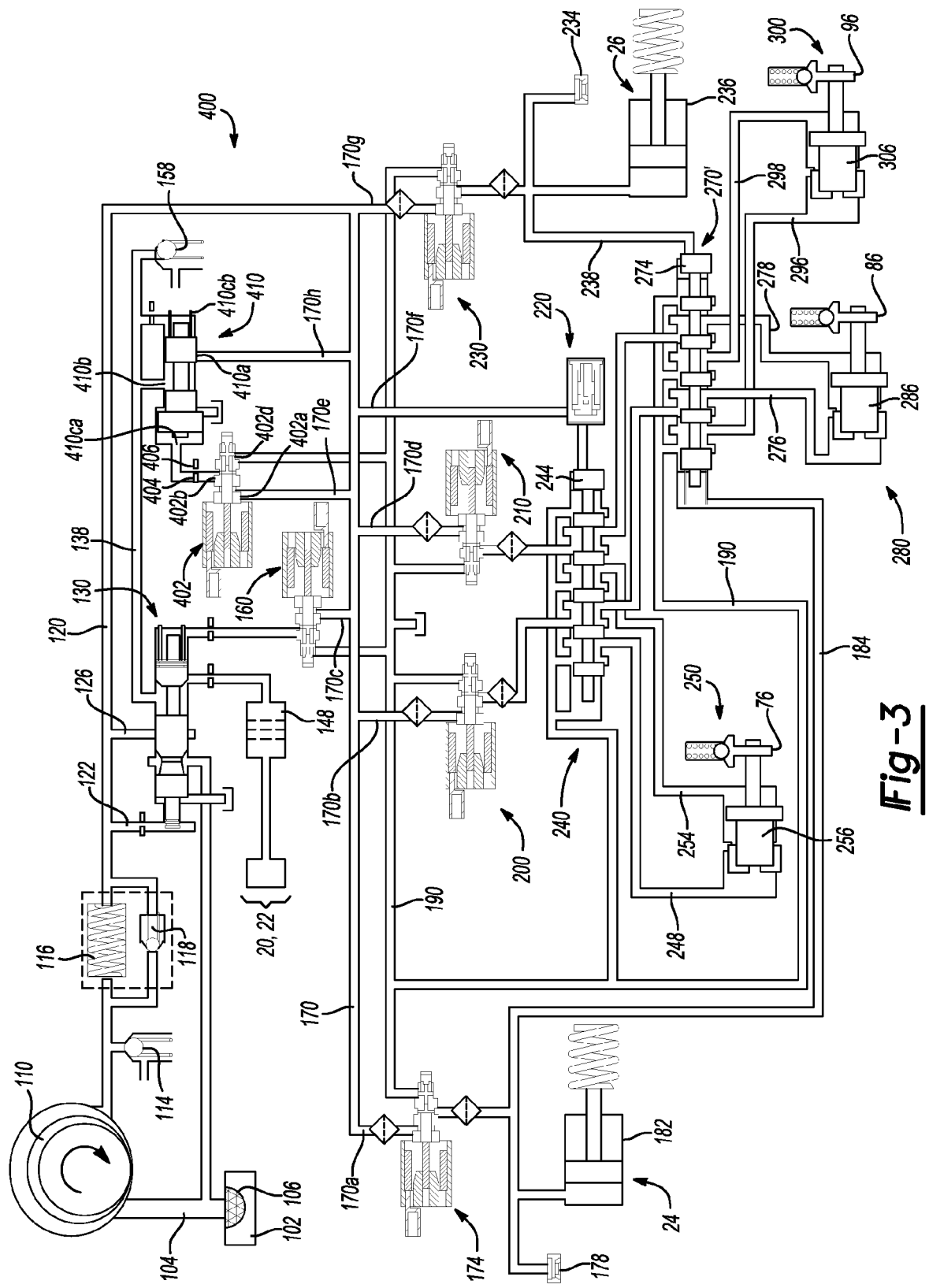
FIG. 3 is a schematic flow diagram of a second embodiment of a hydraulic control system for a wet dual clutch transmission according to the present invention.

Referring now to FIG. 3, a second embodiment of a hydraulic control system for the wet dual clutch transmission 10 illustrated in FIG. 1 is illustrated and generally designated by the reference number 400. The second embodiment hydraulic control system 400 is similar in most respects to the first embodiment control system 100, especially with regard to the hydraulic fluid supply components, the clutch actuation components and the fluid logic and shift actuation components. Thus, the second embodiment control system 400 includes the engine driven pump 110, the line pressure regulator 130, the line pressure solenoid valve 160, the manifold 170, the first clutch solenoid valve 174, the first shift solenoid valve 200, the second shift solenoid valve 210, the master logic solenoid valve 220, the second clutch solenoid valve 230, the first or master logic spool or control valve 240, the first shift actuator assembly 250, a modified or simplified second or slave logic spool or control valve 270', the second shift actuator assembly 280, the third shift actuator assembly 300 and all the related filters and hydraulic lines. It should thus be apparent and understood that shift logic and actuation, i.e., gear selection, is the same with regard to the second embodiment control system 400 as the first embodiment shift control system 100 described in detail above.

The second embodiment 400 differs in the components and configuration of the cooler pressure feed limit valve 150. As will be seen in FIG. 3, there is included an additional variable force solenoid (VFS) valve, namely, a cooler pressure variable force solenoid valve 402 having an inlet port 402A which receives hydraulic fluid from the fifth manifold supply line 170E. The cooler pressure solenoid valve 402 also includes an outlet port 402B which communicates through a line 404 having a flow controlling orifice 406 with a first control port 410CA of a cooler pressure regulator 410. The cooler pressure solenoid valve 402 also includes an exhaust port 402D that is connected to the fluid exhaust manifold 190. In the second embodiment control system 400, the clutch cooling circuit has also been somewhat simplified by omitting the dual, independent clutch cooling circuits.

The cooler pressure regulator 410 includes an inlet port 410A which communicates with the manifold 170 through an eighth manifold supply line 170H. The cooler pressure regulator 410 also includes an outlet port 410B in communication with the hydraulic line 138 and a second control port 410CB, also in communication with the hydraulic line 138. In addition to responding to the line pressure in the hydraulic line 138, it will be appreciated that the output pressure of the cooler pressure regulator 410 is also controlled by the output pressure of the cooler pressure solenoid valve 402 which is applied to the first control port 410CA of the cooler pressure regulator 410. It should be understood, however, that in certain applications, the cooler pressure solenoid valve 402 may be omitted and the line pressure in the fifth manifold supply line 170E provided or supplied directly to the first control port 410CA of the cooler pressure regulator 410.

In the second embodiment control system 400, the clutch cooling circuit has also been somewhat simplified by omitting the dual, independent clutch cooling circuits. Thus, the second or slave logic spool or control valve 270' has been simplified by omitting the three ports 270X, 270Y and 270Z (and the associated land of the spool 274). The associated hydraulic lines 320, 322 and 324 have also been omitted. Instead, the output from the cooler 148 is fed directly to the two wet input clutches 20 and 22.

The foregoing embodiments of the invention having the engine driven pump 110 provide good operational efficiency. The hydraulic control systems 100 and 400 have essentially minimum content to control a wet dual clutch transmission such as the transmission 10 and are thus an efficient control system design.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a wet dual clutch transmission comprising, in combination,
    a source of hydraulic fluid including an engine driven pump, a pressure blow off valve, a cooler pressure regulator and a line pressure regulator,
    a hydraulic fluid cooler,
    a first pressure control variable force solenoid valve in fluid communication with said source of fluid and having a first output provided to a first clutch actuator,
    a second variable force solenoid valve in fluid communication with said source of fluid and having a second output,
    a third variable force solenoid valve in fluid communication with said source of fluid and having a third output,
    a fourth pressure control variable force solenoid valve in fluid communication with said source of fluid and having a fourth output provided to a second clutch actuator,
    a fifth pressure control variable force solenoid valve in fluid communication with said source of fluid and having a fifth output provided to said line pressure regulator,
    a sixth pressure control variable force solenoid valve in fluid communication with said source of fluid and having a sixth output provided to said cooler pressure regulator,
    a first logic valve having a pair of inlets in respective fluid communication with said second output of said second variable force solenoid valve and said third output of said third variable force solenoid valve, a first outlet, a second outlet, a third outlet, a fourth outlet and a control port,
    a first shift actuator having a pair of ports in fluid communication with a pair of said outlets of said first logic valve,
    a second logic valve having a pair of inlets in fluid communication with another pair of said outlets of said first logic valve, two control ports, a first actuator outlet, a second actuator outlet, a third actuator outlet and a fourth actuator outlet, said control ports in respective fluid communication with said first output and said fourth output,
    a second shift actuator having a pair of ports in fluid communication with a pair of said actuator outlets, and
    a third shift actuator having pair of ports in fluid communication with another pair of said actuator outlets.

2. The hydraulic control system of claim 1 wherein said shift actuators each include three area pistons.

3. The hydraulic control system of claim 1 wherein said line pressure regulator is controlled by said fifth output of said fifth pressure control variable force solenoid valve and feedback pressure.

4. The hydraulic control system of claim 1 wherein said source of hydraulic fluid includes a filter and cold oil bypass valve.

5. The hydraulic control system of claim 1 further including a first input clutch acted upon by said first clutch actuator and a second input clutch acted upon by said second clutch actuator.

6. The hydraulic control system of claim 1 further including synchronizer clutches acted upon by said shift actuators.

7. The hydraulic control system of claim 1 further including a two position solenoid valve for selectively providing hydraulic fluid to a control port of said first logic valve.

8. The hydraulic control system of claim 1 further including a cooler over pressure check valve.

9. A hydraulic control system for a wet dual clutch transmission comprising, in combination,
    a source of hydraulic fluid including an engine driven pump, a pump bypass valve and a pressure regulator valve,
    a heat exchanger for removing heat from said hydraulic fluid, a first pressure control variable force solenoid valve in fluid communication with said source of fluid and having a first output communicating with a first input clutch actuator, a second variable force solenoid valve in fluid communication with said source of fluid and having a second output, a third variable force solenoid valve in fluid communication with said source of fluid and having a third output, a fourth pressure control variable force solenoid valve in fluid communication with said source of fluid and having a fourth output communicating with a second input clutch actuator, a fifth pressure control variable force solenoid valve in fluid communication with said source of fluid and having a fifth output provided to said pressure regulator valve, a first logic valve having a pair of inlets in respective fluid communication with said second output of said second variable force solenoid valve and said third output of said third variable force solenoid valve, a first outlet, a second outlet, a third outlet, a fourth outlet and a control port, a first shift actuator having a pair of ports in fluid communication with a pair of said outlets of said first logic valve, a second logic valve having a pair of inlets in fluid communication with another pair of said outlets of said first logic valve, two control ports, a first actuator outlet, a second actuator outlet, a third actuator outlet and a fourth actuator outlet, said control ports in respective fluid communication with said first output and said fourth output, a third inlet in fluid communication with said heat exchanger and two outlets in fluid communication with respective said first and said second input clutch actuators, a second shift actuator having a pair of ports in fluid communication with a pair of said actuator outlets of said second logic valve, and a third shift actuator having a pair of ports in fluid communication with another pair of said actuator outlets of said second logic valve.

10. The hydraulic control system of claim 9 further including a two position solenoid valve for selectively providing hydraulic fluid to a control port of said first logic valve.

11. The hydraulic control system of claim 9 further including a first input clutch acted upon by said first clutch actuator and a second input clutch acted upon by said second clutch actuator.

12. The hydraulic control system of claim 11 further including a pressure regulator for controlling hydraulic fluid pressure to said heat exchanger.

13. The hydraulic control system of claim 9 further including a shift fork and a synchronizer clutch associated with each of said shift actuators.

14. The hydraulic control system of claim 9 further including a line pressure regulator valve controlled by said first pressure control variable force solenoid valve and feed back pressure.

15. The hydraulic control system of claim 9 further including a cooler overpressure check valve.

* * * * *